J. DEVLIN.
Improvement in Apparatus for Forcing Beer from Barrels.
No. 133,084. Patented Nov. 19, 1872.
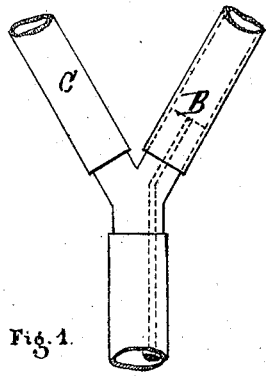
Fig. 1.
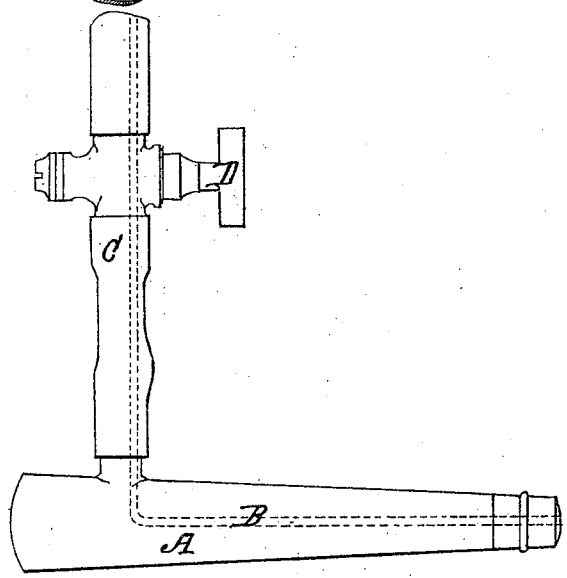
Fig. 2.
Fig. 3.

UNITED STATES PATENT OFFICE.

JOHN DEVLIN, OF BROOKLYN, NEW YORK.

IMPROVEMENT IN APPARATUS FOR FORCING BEER FROM BARRELS.

Specification forming part of Letters Patent No. 133,084, dated November 19, 1872.

*To all whom it may concern:*

Be it known that I, JOHN DEVLIN, of Brooklyn, Kings county, and State of New York, have invented certain Improvements in Apparatus for Forcing Beer and other Liquors from Barrels in a cellar to the delivery-cocks in a bar-room, of which the following is a specification:

My invention consists of an improvement in the device for which Letters Patent were issued to me May 28, 1872, for forcing beer from barrels; which device I found from experience needed further improvements. Inasmuch as should the air conveyance to the beer-barrel become leaky or deranged there would not be sufficient resistance by the air to prevent the beer running into the air-tube, and the beer would also, for this reason, run back from the delivery-cocks into the beer-barrel, with no way of shutting off the air and beer until the derangement was rectified. These defects in my former device I have overcome by placing a compound cock in the air-forcing and beer-delivery pipes, and a valve in the inner end of the plug or faucet, by means of which the beer is prevented access to the air-conveyance, or return from the delivery-cocks to the beer-barrel, in case of derangement or during repairs, as I will further explain by reference to the accompanying drawing, of which—

Figure 1 is an elevation of my invention; Fig. 2, a vertical section of same, showing compound cock and valve; and Fig. 3, a horizontal section of compound cock.

In the said drawing, A is the plug or faucet. B is the air-tube leading from an air-pump or other forcing device through the plug into the beer-barrel. C is the beer-pipe encompassing the air-pipe, through which and through the plug the beer is forced by the air up to the delivery-cocks at the bar. D is the compound cock which shuts off the air from the beer-barrel and prevents return of the beer from the delivery-cocks to the barrel; and E is the valve in the inner end of the plug, which will allow the air to enter the barrel, but prevents access by the beer to the air-pipe in case of leakage.

What I claim is—

The compound cock D and valve E, in combination with the plug A, air-pipe B, and beer-delivery pipe C, substantially as and for the purposes set forth.

In testimony whereof I have hereunto set my signature.

JOHN DEVLIN.

Witnesses:
ARTHUR NEILL,
CHARLES ZIMMERMAN.